W. SCHEMMANN & J. BRONN.
FURNACE FOR THE TREATMENT OF METALS.
APPLICATION FILED OCT. 19, 1907.
915,488.
Patented Mar. 16, 1909.
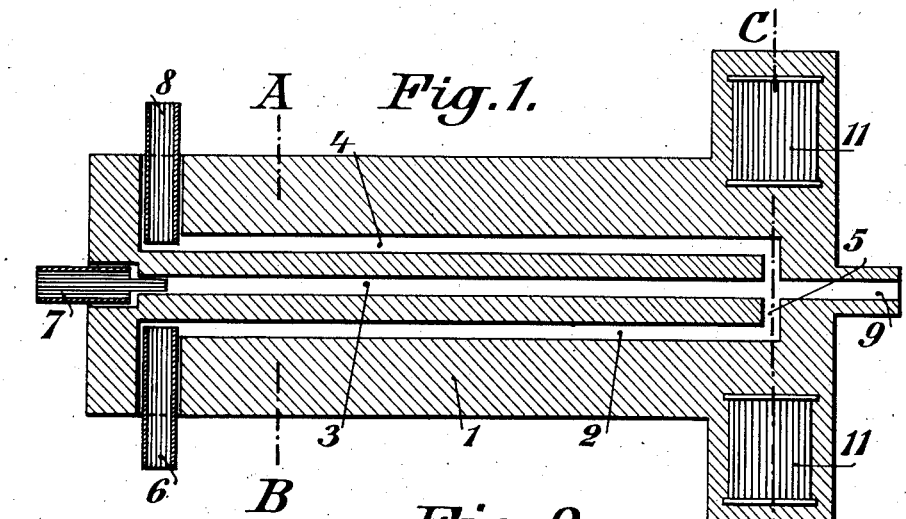
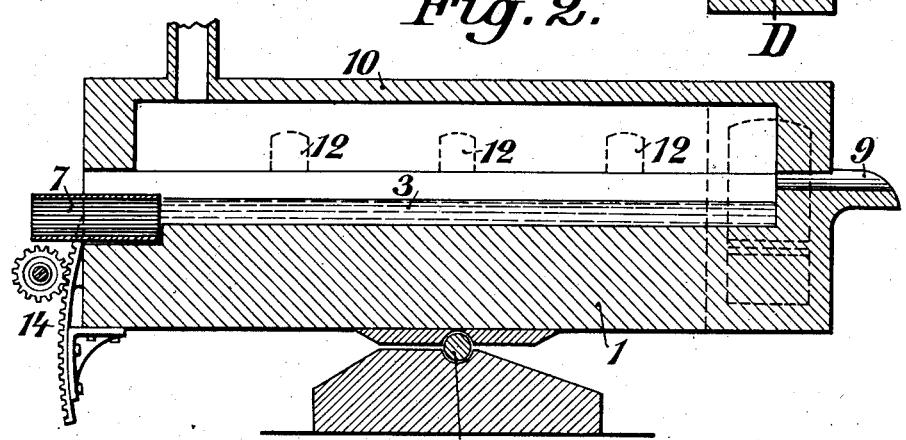
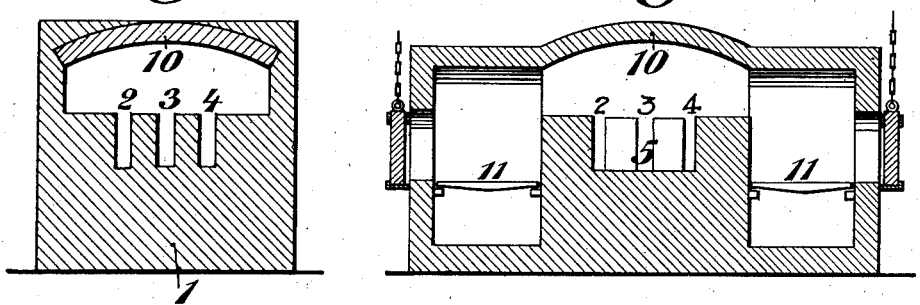
WITNESSES
INVENTORS
Wilhelm Schemmann
and Jegor Bronn
by their ATTORNEYS

UNITED STATES PATENT OFFICE.

WILHELM SCHEMMANN AND JEGOR BRONN, OF ROMBACH, GERMANY.

FURNACE FOR THE TREATMENT OF METALS.

No. 915,488.  Specification of Letters Patent.  Patented March 16, 1909.

Application filed October 19, 1907. Serial No. 398,204.

*To all whom it may concern:*

Be it known that we, WILHELM SCHEMMANN, engineer, a subject of the German Emperor, residing at 14 Hüttenstrasse, Rombach, Germany, and JEGOR BRONN, engineer, a subject of the Russian Emperor, residing at 10a Vorstadtstrasse, Rombach, Germany, have invented certain new and useful Improvements in Furnaces for the Treatment of Metals; and we do hereby declare the following to be a full, clear, and exact description of the invention, such as will enable others skilled in the art to which it appertains to make and use the same.

A certain quantity of manganese is contained in nearly all malleable iron and steel. The greater part of the manganese is introduced into the liquid metal by the addition of ferromanganese which is an alloy of iron containing manganese in varying quantity up to 83% the addition taking place during treatment whether in a converter or by Siemens-Martins, Talbot or electric process. This addition of ferromanganese is effected by throwing large pieces of ferromanganese into the liquid metal immediately before pouring or tapping. This method of working has several drawbacks as for instance when thrown in a considerable portion of ferromanganese is retained by the tough layer of slag on the molten metal and is thus lost. Further the distribution of manganese in the molten metal is not uniform and moreover the temperature of the metal bath is considerably reduced by the addition of the ferromanganese in solid form with the result that the quality of product is liable to be affected. It has now been found that all these drawbacks disappear if the ferromanganese is melted separately and added in a liquid state to the liquid iron. The ordinary cupola or like furnaces are however unsuitable for use in the melting of ferromanganese as a considerable portion of the manganese is thereby burned and converted into slag. Electric arc furnaces of ordinary type are also unsuitable owing to ease and rapidity with which volatilization of the manganese takes place therein. As most metallurgical works mainly employ three-phase current it appears suitable to work the melting furnace also with three phase current, in order to avoid the expensive conversion of the three phase current into two phase or a single phase alternating current.

In the accompanying drawings, Figure 1 is a horizontal section, Fig. 2 is a vertical longitudinal section, Figs. 3 and 4 show cross sections of the furnace on the lines A—B and C—D respectively.

The furnace is made of fire-proof material 1 provided with three long grooves 2, 3, 4 which at one end lead into a common cross conduit 5, the other ends of the grooves terminating with electrodes 6, 7, 8 made of steel plates, carbon blocks or the like, disposed in accordance with the three phase current employed. The furnace is provided with a tapping hole 9. Above the three grooves or conduits is arranged a cover 10 slightly arched in order to reduce the radiation of heat. It is, moreover, advisable to provide an auxiliary furnace 11 or to keep the arch 10 hot by means of electricity.

The charging is effected with small pieces of ferromanganese through the charging openings 12. The whole furnace rests on a spindle 13, so that it can be easily tipped forward by means of suitable mechanism 14.

It is advisable to give the furnace a capacity of from five to ten times the quantity that has to be drawn off at each tapping. When manganese is to be added to a charge of metal the furnace is slightly tipped, and the desired quantity of liquid ferromanganese taken out through the tap hole. Thereupon a corresponding quantity of solid ferromanganese is thrown into the conduits where it quickly melts in the large quantity of liquid ferromanganese already there. The furnace is kept constantly working, and even during tapping the current is not cut off, whereby the consumption of current is rendered very uniform, and complicated switch instruments become unnecessary. Moreover, owing to the avoidance of interruption of current, the available source of energy is better utilized.

Incidentally this said furnace may also be utilized for smelting and refining other metals.

If the treatment of iron is carried on in the manner hereinbefore described by the addition of ferromanganese in a liquid state then a very uniform distribution of manganese is insured in the cast steel. Moreover, it has been found that by working according to this process, a much smaller proportion of manganese is sufficient in order to produce malleable iron and steel suitable for further treatment. Thus for instance cross-sections which when the steel was produced by adding ferromanganese in solid form required at least 0.4% manganese, can be easily rolled even if the steel contains only 0.29% manganese provided the ferromanganese has been added in liquid form. A saving in manganese is therefore obtained for two reasons: In the first place there is no loss owing to the formation of slag, and secondly the proportion of manganese in steel can be decreased without risk of reducing the quality of the steel. If, for instance, a converter charge of 15 tons of metal is to be finished by the addition of ferromanganese in solid form taking into consideration that 25% of the manganese added, that is to say one-third of the manganese remaining in iron becomes converted into slag it is necessary for the purpose to use $15000 \times \frac{0.4}{100} \times \frac{4}{3} = 80$ kg. of manganese or 100 kg. of ferromanganese containing 80% of manganese.

If ferromanganese is added in liquid form then for manufacturing a steel of at least the same quality and equally suitable for rolling, it is sufficient to have $15000 \times \frac{0.3}{100} = 45$ kg. of manganese or 56 kg. of ferromanganese.

If the total consumption of ferromanganese in a steel foundry is considered the saving effected on a large number of charges will be still greater for the following reasons. It is well known that ferromanganese of high percentage cannot be stored as the richer it is in manganese, the quicker it is decomposed by the action of the moisture of the air into powder. As the latter is kept back by the slag cover when being thrown into the metal bath, it could not up to now be used at all and formed an inconvenient and expensive waste. If the ferromanganese is liquefied first in the manner hereinbefore described, even the powdered ferromanganese can be melted so that also in this respect the process according to this invention is advantageous in view of the necessity of having large stores of ferromanganese which cannot be avoided where manufacture is carried on a large scale.

Having now particularly described and ascertained the nature of our said invention and in what manner the same is to be performed we declare that what we claim is:—

1. In a furnace for the treatment of metals, the combination of three grooves formed in the hearth of the furnace for the reception of the metal, a cross-conduit connecting these grooves at one end, an electrode entering the other end of each groove, a source of electric power connected to the electrodes means for charging the metal into the grooves and means for drawing off the molten metal as set forth.

2. In a furnace for the treatment of metals, the combination of three grooves formed in the hearth of the furnace for the reception of the metal, a cross-conduit entering these grooves at one end, an electrode entering the other end of each groove, a generator of three phase electric current connected to the electrodes, a cover for the furnace, a charging opening and a tapping hole as set forth.

3. In a furnace for the treatment of metals, the combination of three grooves formed in the hearth of the furnace for the reception of the metal, a cross conduit entering these grooves at one end, an electrode entering the other end of each groove, a generator of three phase electric current connected to the electrodes, a cover for the furnace, means for applying heat to this cover, a charging opening, and a tapping hole as set forth.

4. In a furnace for the treatment of metals, the combination of three grooves formed in the hearth of the furnace for the reception of the metal, a cross-conduit connecting these grooves at one end, an electrode entering the other end of each groove, a source of electric power connected to the electrodes, a cover for the furnace, a charging opening, a tapping hole, a pivotal mounting for the furnace and means for tipping the furnace as set forth.

5. In a furnace for the treatment of metals, the combination of three grooves formed in the hearth of the furnace for the reception of the metal, a cross-conduit connecting these grooves at one end, an electrode entering the other end of each groove, a generator of three phase electric current connected to the electrodes, an arched cover for the furnace, means for applying heat to this cover, a charging opening, a tapping hole, a pivotal mounting for the furnace and means for tipping the furnace as set forth.

6. In a furnace for the treatment of metals, the combination of a tilting hearth, a generator of three phase electric current, electrodes connected to this generator and disposed in the hearth, receptacles formed in the hearth for the metal, these receptacles being so disposed between the points of entry of the electrodes that the metal in the receptacles will constitute a resistance between the electrodes, means for charging the metal into these receptacles and means for drawing off the molten metal as set forth.

7. In a furnace for the treatment of metals, the combination of a hearth, a generator of three phase electric current, electrodes connected to this generator and disposed in the hearth, receptacles formed in the hearth for the metal, these receptacles being so disposed between the points of entry of the electrodes that the metal in the receptacles will constitute a resistance between the electrodes, a cover for the furnace, means for applying heat to this cover, means for charging the metal into the furnace and means for drawing off the molten metal as set forth.

8. In a furnace for the treatment of metals, the combination of a hearth, a generator of three phase electric current, electrodes connected to this generator and disposed in the hearth, receptacles formed in the hearth for the metal, these receptacles being so disposed between the points of entry of the electrodes that the metal in the receptacles will constitute a resistance between the electrodes a cover for the furnace, means for applying heat to this cover, means for charging the metal into the furnace. means for drawing off the molten metal, a pivotal mounting for the furnace and means for tipping the furnace as set forth.

In testimony, that we claim the foregoing as our invention, we have signed our names in presence of two subscribing witnesses.

WILHELM SCHEMMANN
JEGOR BRONN.

Witnesses:
LOUIS VANDORY,
T DEPNER.